(12) United States Patent
Otsuka

(10) Patent No.: US 8,788,924 B2
(45) Date of Patent: Jul. 22, 2014

(54) LINK TREE CREATION DEVICE

(75) Inventor: Naoki Otsuka, Konan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 207 days.

(21) Appl. No.: 12/397,947

(22) Filed: Mar. 4, 2009

(65) Prior Publication Data
US 2009/0235153 A1    Sep. 17, 2009

(30) Foreign Application Priority Data

Mar. 14, 2008    (JP) .................................. 2008-065651

(51) Int. Cl.
*G06F 17/30* (2006.01)
*G06F 17/22* (2006.01)

(52) U.S. Cl.
CPC ........ *G06F 17/2235* (2013.01); *G06F 17/2241* (2013.01); *G06F 17/3089* (2013.01)
USPC .......................................... 715/205; 715/206

(58) Field of Classification Search
CPC ............ G06F 17/2235; G06F 17/2241; G06F 17/3089
USPC ......................................... 715/208, 205, 206
See application file for complete search history.

(56) References Cited

U.S. PATENT DOCUMENTS

| | | | | |
|---|---|---|---|---|
| 6,631,496 B1 * | 10/2003 | Li et al. | .......................... | 715/200 |
| 6,667,751 B1 * | 12/2003 | Wynn et al. | .................... | 715/833 |
| 6,832,350 B1 * | 12/2004 | Bates et al. | ................... | 715/206 |
| 6,982,708 B1 * | 1/2006 | Mah et al. | ...................... | 345/418 |
| 7,062,475 B1 * | 6/2006 | Szabo et al. | .................... | 706/11 |
| 7,249,315 B2 * | 7/2007 | Moetteli | ....................... | 715/234 |
| 7,392,488 B2 * | 6/2008 | Card et al. | ..................... | 715/853 |
| 7,581,170 B2 * | 8/2009 | Baumgartner et al. | ........ | 715/234 |

(Continued)

FOREIGN PATENT DOCUMENTS

| | | |
|---|---|---|
| JP | H09-185634 A | 7/1997 |
| JP | H10-124518 A | 5/1998 |

(Continued)

OTHER PUBLICATIONS

Japan Patent Office, Decision of Refusal for Patent Application No. JP2008-065651, dated Sep. 14, 2010. (counterpart to above-captioned U.S. patent application).

(Continued)

*Primary Examiner* — Stephen Hong
*Assistant Examiner* — Marshon Robinson
(74) *Attorney, Agent, or Firm* — Baker Botts L.L.P.

(57) ABSTRACT

A computer-readable medium having a link tree creation program stored thereon and readable by a computer, the link tree creation program, when executed by the computer, causes the computer to create a link tree in relation to links pertaining to Web pages receivable via a network. The link tree creation program causes a computer to function as a link search unit that searches a link from a file of a specified Web page, a link list preparation unit that adds the searched link to a list of a link tree, which root indicating a link to the specified Web page, a tree addition determination unit that compares the searched link with the root of the link tree and determines whether creating an additional link tree rooted from the searched link, and a tree creation unit that creates an additional link tree from a determination of the tree addition determination unit.

15 Claims, 11 Drawing Sheets

(56) References Cited

U.S. PATENT DOCUMENTS

| | | | |
|---|---|---|---|
| 2001/0042063 A1* | 11/2001 | Ebert | 707/3 |
| 2002/0032746 A1* | 3/2002 | Lazaridis | 709/217 |
| 2002/0049809 A1* | 4/2002 | Moetteli | 709/203 |
| 2002/0091836 A1* | 7/2002 | Moetteli | 709/227 |
| 2002/0147742 A1* | 10/2002 | Schroeder | 707/501.1 |
| 2002/0178142 A1* | 11/2002 | Higashigawa | 707/1 |
| 2003/0030679 A1* | 2/2003 | Jain | 345/854 |
| 2003/0144998 A1* | 7/2003 | Bennett et al. | 707/3 |
| 2004/0148571 A1* | 7/2004 | Lue | 715/514 |
| 2005/0022115 A1* | 1/2005 | Baumgartner et al. | 715/513 |
| 2005/0022132 A1* | 1/2005 | Herzberg et al. | 715/759 |
| 2005/0044168 A1* | 2/2005 | Pang et al. | 709/217 |
| 2005/0102684 A1* | 5/2005 | McKeon | 719/328 |
| 2005/0120114 A1* | 6/2005 | Nadamoto et al. | 709/225 |
| 2005/0120292 A1* | 6/2005 | Suzuki | 715/501.1 |
| 2005/0198567 A1* | 9/2005 | Vermeulen et al. | 715/513 |
| 2005/0250489 A1* | 11/2005 | Lazaridis | 455/426.1 |
| 2006/0028669 A1 | 2/2006 | Kumagai | |
| 2008/0098039 A1* | 4/2008 | Kruis et al. | 707/201 |
| 2008/0172404 A1* | 7/2008 | Cohen | 707/102 |
| 2008/0228675 A1* | 9/2008 | Duffy et al. | 706/10 |
| 2008/0263434 A1* | 10/2008 | Schroeder | 715/205 |
| 2009/0070306 A1* | 3/2009 | Stroe et al. | 707/4 |
| 2009/0210781 A1* | 8/2009 | Hagerott et al. | 715/234 |

FOREIGN PATENT DOCUMENTS

| | | |
|---|---|---|
| JP | H10-171703 A | 6/1998 |
| JP | 2000-020544 A | 1/2000 |
| JP | 2000-076104 A | 3/2000 |
| JP | 2004-213692 A | 7/2004 |
| JP | 2006-031191 A | 2/2006 |
| JP | 2006-044114 A | 2/2006 |
| JP | 2006-343905 A | 12/2006 |

OTHER PUBLICATIONS

Japan Patent Office, Notification of Reasons for Refusal in Japanese Patent Application No. 2008-065651, dated May 18, 2010 (counterpart to the above-captioned U.S. patent application).

Nobukatsu Hiranoya, "Pressure Point for Realizing Internet Access Comfort," Oh!PC, Softbank Publishing Corporation, vol. 18, No. 6, pp. 151-162, dated Dec. 1, 1999 (concise explanation of relevance provide in attached Office Action).

Yasushito Asano, "Discovery of Graph Structure by Visualization of Web Link," 13-th Data Engineering Workshop (DEWS202) Transactions [online], The Institute of Electronics, Information and Communication Engineers, Data Engineering Research Expert Committee, URL—http://www.ieice.org/iss/de/DEWS/proc/2002/papers/C4-5.pdf, dated May 15, 2002 (English language abstract included; reference cited in attached Office Action).

* cited by examiner

LINK TREE CREATION DEVICE

CROSS-REFERENCE TO RELATED APPLICATIONS

This application claims priority from Japanese Patent Application No. 2008-065651 filed on Mar. 14, 2008, the entire subject matter of which is incorporated herein by reference.

TECHNICAL FIELD

The invention relates to a link tree creation device that create a link tree in relation to a link placed on Web pages and, more specifically, to a link tree creation device that enable creation of a plurality of link trees distinguished from each other by a Web site.

BACKGROUND

Internet has been widely used for acquiring information, and a reference can be made to various pieces of information by accessing a Web site through World Wide Web (WWW) server from a computer. The Web site accessed by the computer includes, for example, a top Web page (i.e., a home page) and a plurality of linked Web pages. Location information about Web pages associated with each other by a link is useful information. There has been created a link tree showing the nature of a link structure. JP-A-2004-213692 discloses a related art digital copier that creates a link tree. For example, when printing a home page by tracing a link, the related art digital copier creates a link tree representing a link by means of taking the link tree as a final page at the time of printing of the home page and prints the created link tree.

SUMMARY

Illustrative aspects of the invention provide a link tree creation device that is capable of separately creating a link tree according to a predetermined condition.

DETAILED DESCRIPTION

General Overview

Figure 1:
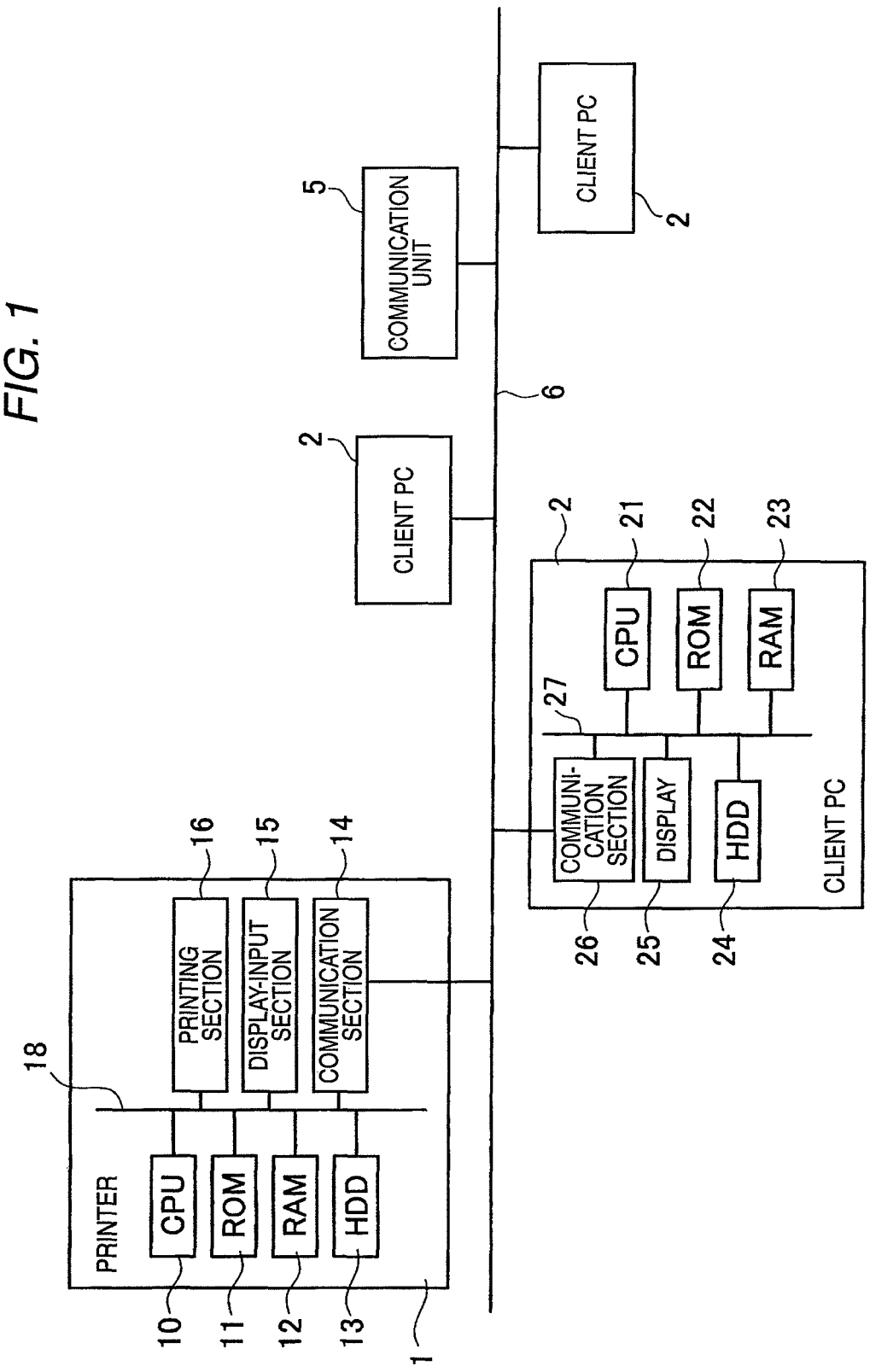
FIG. 1 is a block diagram showing a network.

The related art technique as described above has some disadvantages. For example, a link placed on respective Web pages includes Web pages of an external site, as well as including Web pages in the Web sites. Therefore, if a link tree is created by tracing external sites, the link tree will become endlessly large in some occasions. The link tree, which should be effective information, becomes difficult to see. Thus, the link tree may become useless.

In contrast, for example, if the external sites are disconnected from the link tree and if the link tree is created solely within the Web site, effective information will be lost when a link to an important Web page is located outside the range.

Accordingly, illustrative aspects of the invention provide a link tree creation device that is capable of separately creating a link tree according to a predetermined condition.

According to a first aspect of the invention, there is provided a computer-readable medium having a link tree creation program stored thereon and readable by a computer, the link tree creation program, when executed by the computer, causes the computer to create a link tree in relation to links pertaining to Web pages that are receivable via a network, the link tree creation program causing a computer to function as: a link search unit that searches a link from a file of a specified Web page; a link list preparation unit that adds the searched link to a list of a link tree, a root of the link tree indicating a link to the specified Web page; a tree addition determination unit that compares the searched link with the root of the link tree, and determines whether or not to create an additional link tree rooted from the searched link; and a tree creation unit that creates at least one additional link tree in accordance with a determination of the tree addition determination unit.

According to a second aspect of the invention, in the computer-readable medium, wherein the specified Web page is located in a first site, and a Web page indicated by the searched link is located in a second site, and wherein the tree addition determination unit determines to create the additional link tree if the second site is different from the first site.

According to a third aspect of the invention, in the computer-readable medium, wherein, even if the second site is different from the first site, the tree addition determination unit determines not to create the additional link tree if an URL indicated by the searched link and an URL indicated by the root of the link tree have an identical domain name.

According to a fourth aspect of the invention, in the computer-readable medium, wherein the Web page is located in a first site, and wherein, if the searched link includes a higher-hierarchy link, which hierarchy is higher than a hierarchy of the link of the root of the link tree, the tree addition determination unit determines to create the additional link tree rooted from the higher-hierarchy link even if a Web page indicated by the searched link is located in the first site.

According to a fifth aspect of the invention, in the computer-readable medium, wherein the computer-readable medium further causes the computer to function as a hierarchy determination unit that, upon receipt of a signal designating the number of hierarchies of respective link trees, searches links to the hierarchies.

According to a sixth aspect of the invention, in the computer-readable medium, wherein the link list preparation unit comprises a listing unit that does not add the searched link to the list of the link tree, if the listing unit confirms that the searched link corresponds to at least one of a link to an URL configured under a scheme name other than http, a link to a file other than an HTML file, and a link that has been listed on the list.

According to a seventh aspect of the invention, in the computer-readable medium, wherein the computer comprises a display unit, and wherein the computer-readable medium further causes the computer to function as a routing unit that creates a link tree routed from a link to a Web page displayed on a display unit or from a link to a designated URL.

According to an eighth aspect of the invention, in the computer-readable medium, wherein the link tree is configured such that each link of the link tree displays an URL.

According to a ninth aspect of the invention, in the computer-readable medium, wherein the link-tree creation program further causes the computer to function as a display level selection unit that selects a display level of the URL.

According to a tenth aspect of the invention, in the computer-readable medium, wherein the link-tree creation program further causes the computer to function as an image display selection unit that selects a display of an image including an icon or a thumbnail in addition to the URL.

According to an eleventh aspect of the invention, there is provided a link tree creation device that creates a link tree in relation to links pertaining to Web pages that are receivable via a network, the link tree creation device comprising: a link search unit that searches a link from a file of a specified Web page; a link list preparation unit that adds the searched link to a list of a link tree, a root of the link tree indicating a link to the specified Web page; a tree addition determination unit that compares the searched link with the root of the link tree, and determines whether or not to create an additional link tree rooted from the searched link; and a tree creation unit that creates at least one additional link tree in accordance with a determination of the tree addition determination unit.

According to a twelfth aspect of the invention, there is provided a method for creating a link tree in relation to links pertaining to Web pages that are receivable via a network, the method comprising: searching a link from a file of a specified Web page; adding the searched link to a list of a link tree, a root of the link tree indicating a link to the specified Web page; comparing the searched link with the root of the link tree, and determining whether or not to create an additional link tree rooted from the searched link; and creating at least one additional link tree in accordance with a result of the determining.

According to the aspects of the invention, a link tree that is organized as information and easy to see can be created by splitting a link tree, which would be complicate in a single form, under predetermined conditions. For example, according to the second aspect of the invention, links of another site are taken as a child tree, and another tree is created. Thus, a parent tree configured by links of a single site becomes easy to see, and information about effective links in another site can also be ascertained by means of a child tree.

According to the third aspect of the invention, even links of another site are included into a single link tree, so long as the links have the same domain name, excessive break-down of the link tree can be prevented. Thus, the link tree can become user-friendly.

According to the fourth aspect of the invention, higher-hierarchy links are created in the form of another link tree. Accordingly, a positional relationship of the link serving as the starting point becomes easy to understand.

According to the fifth aspect of the invention, a link tree is created in accordance with a designated hierarchy. Accordingly, a link tree can be implemented in an appropriate size.

According to the sixth aspect of the invention, a predetermined link, such as a link to an URL configured under a scheme name other than http, is not included in the list. Accordingly, a link tree pertaining to a required Web page can be created.

According to the seventh aspect of the invention, by enabling arbitrarily setting of the root of the link to the Web page displayed on the display unit, usability can be improved.

According to the eighth aspect of the invention, by changing the showing level of the link tree, the link tree can be created in a required format.

According to the ninth aspect of the invention, by displaying the image, such as the icon or the thumbnail, it becomes easy to ascertain correlation among split link trees.

According to the tenth aspect of the invention, it becomes possible to create a link tree that is organized as information and easy to see, by splitting a link tree, which would become complicate in a single form, under predetermined conditions.

Exemplary Embodiments

Exemplary embodiments of the invention will be described with reference to the drawings.

FIG. 1 is a block diagram showing a common network. A printer 1 and a plurality of client computers (hereinafter called "client PCs") 2 are connected to each other by way of a LAN 6 as an example of a network. The client PCs 2 is connected to the Internet by way of a communications unit 5 (e.g., a router) and can establish data communication with an external environment The printer 1 includes ROM 11 for storing a control program; RAM 12 for temporarily storing data being processed; a hard disk drive (HDD) 13 for storing data; and a communication section 14 that is an interface for connecting the printer 1 to the network. The printer 1 further includes a display-input section 15 having buttons and a touch panel screen and a printing section 16 for performing printing operation. Further, the printer 1 includes a control section (CPU) 10 for controlling the HDD 13, the communication section 14, the display-input section 15, and the printing section 16, and these elements are interconnected by means of a system bus 18. In the exemplary embodiment, a link tree creation program is stored in the ROM 11, and preparation of a link tree and printing thereof, which will be described later, are carried out.

The client PC2 includes a CPU 21, ROM 22, RAM 23, a hard disk drive (HDD) 24, a display 25, and a communication section 26, and these elements are interconnected by way of a system bus 27 and connected to the LAN 6 by way of the communication section 26. The client PC2 stores various application programs in the ROM 22 or the HDD 24, and the CPU 21 executes the programs, thereby enabling implementation of various functions.

A case where information about a certain matter is collected by use of the Internet will be conceived as example implementation of the link tree creation program. Browsing is performed by accessing various Web sites on the client PC2, which is connected to the Internet from the LAN 6 by way of the communication unit 5, by use of a Web browser. Accordingly, when an access is made to a Web site disclosing desired information, a further advancement to Web pages configuring the Web site is made, and contents of the pages are ascertained. The link tree creation program of the exemplary embodiment is stored in the client PC2; a link tree is created in association with the Web pages to which the access was made; and the created link tree is printed by the printer 1.

Figure 2:
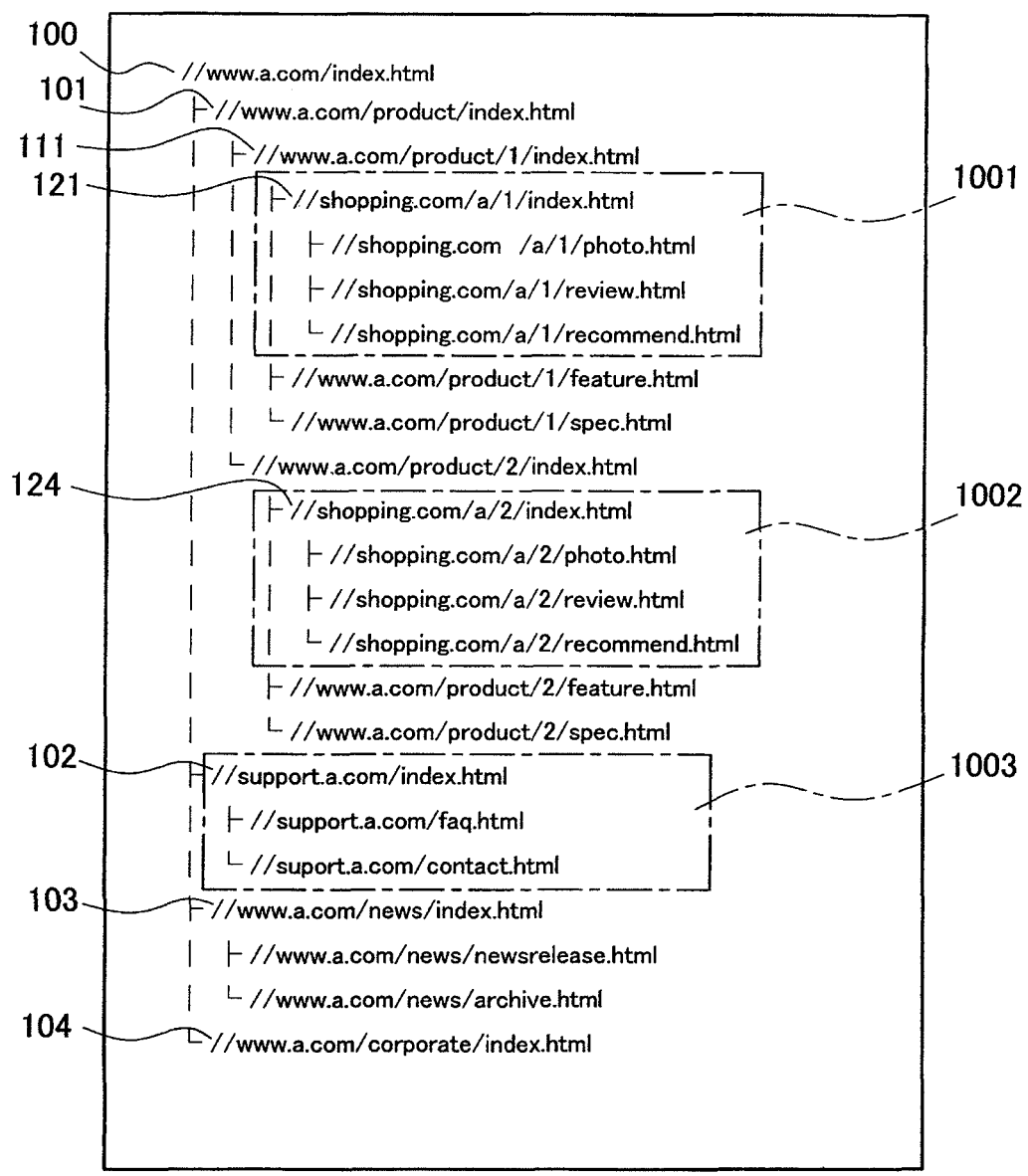
FIG. 2 is a view showing a link tree of a related-art type.
Figure 3A:
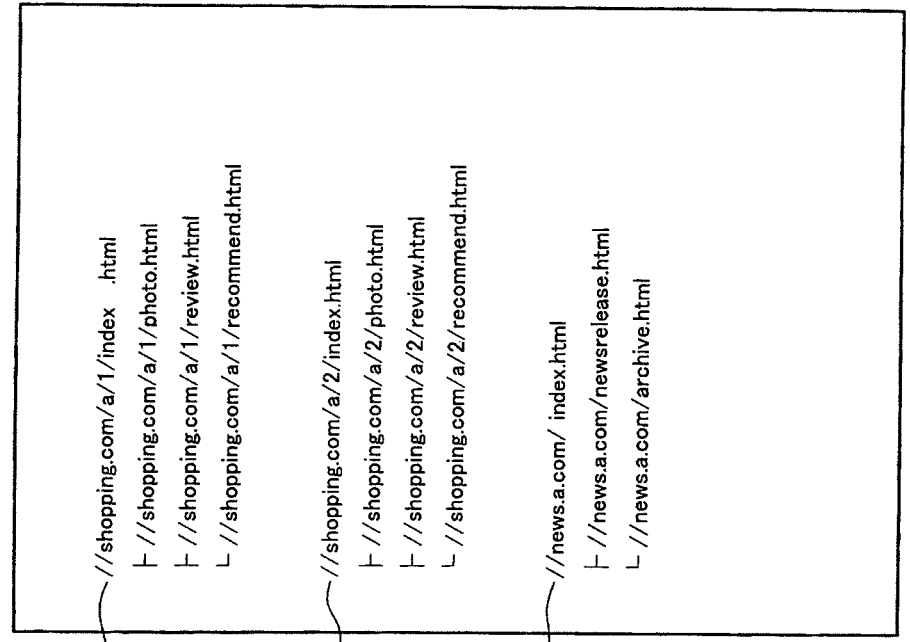
FIGS. 3A and 3B are views showing link trees according to an exemplary embodiment of the invention.
Figure 3B:
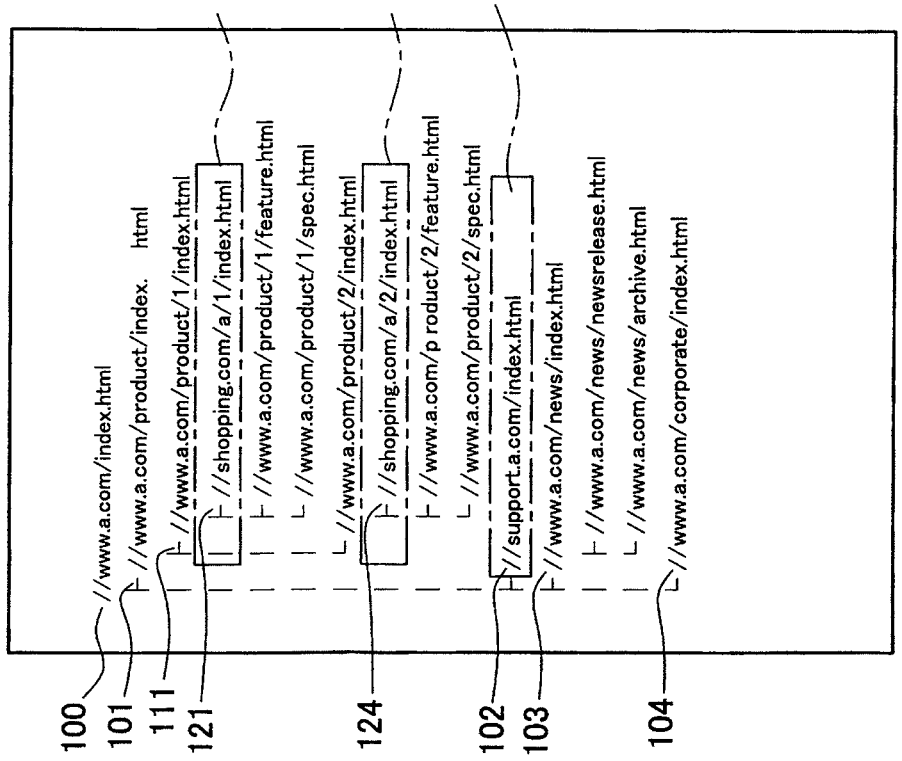

The link tree creation program executed by the client PC2 will now be specifically described. In the client PC2, the Web pages are displayed on the display 25; various types of link trees are created in this state in accordance with a request for printing a link tree; and the created link trees are printed by the printer 1. FIGS. 2 to 3B are views showing a printed link tree. FIG. 2 is a link tree of a related-art type. FIGS. 3A and 3B are link trees created by the link tree creation program of the exemplary embodiment. Both of them are link trees showing a relationship among links.

The link tree is created by arranging uniform resource locators (URLs) showing locations of the respective Web pages. The illustrated link tree is created while the Web page appearing on the display 25 is taken as a starting point. Accordingly, the link tree is configured such that URLs of Web pages linked to a lower hierarchy in structure from; for example, a URL 100 ("//www.a.com/index.html") of the home page serving as a starting point are expanded.

A link tree that is created by a related-art program and that is shown in FIG. 2 is first ascertained. URLs 101 to 104 are linked to the Web page displayed on the display 25. A look at the URL 101 of the URLs shows that URLs 111, 121, and 124 are additionally linked, in sequence, at a much lower hierarchy. Specifically, the link tree represents Web pages of linked external sites in a hierarchical format, as well as representing Web pages in the same site in the hierarchical format, and the Web pages of the external sites are displayed while included in one link tree. In the link tree shown in FIG. 2, areas 1001 and 1003 enclosed by a dashed line correspond to URLs (121, 124, and the like) showing Web pages of external sites. That is, a dashed-line frame represents that the Web pages belong to the external sites. Incidentally, the dashed line and the dashed-line frame are merely used for an explanation, and an actual link tree does not include such a dashed line and a dashed-line frame.

By imposing a limitation on the number of links, the link tree is not extremely difficult to see. However, if an increase arises in the number of links, the link tree will become larger and hard to see. For example, in a case where an attempt is made to print the link tree on an A4-size sheet, the link tree is bifurcated and printed over a plurality of pages, which makes the link tree more difficult to see. Accordingly, in the program of the exemplary embodiment, for example, a link tree that draws a distinction between Web pages belonging to a single site and Web pages belonging to an external site are created. FIGS. 3A and 3B show a link tree created from the link tree shown in FIG. 2 by the program of the exemplary embodiment. FIG. 3A is a link tree of Web pages belonging to the same site, and FIG. 3B is a link tree of Web pages belonging to the external sites.

The link tree for the single site shown in FIG. 3A has descriptions about the URLs 101 to 104 linked to the Web page of the URL 100 and URLs 111 and 121 linked at a lower hierarchy, as does the related-art link tree shown in FIG. 2. However, in relation to the Web pages of the external sites, only the URLs 121, 124, and 102 of the Web pages served as an entrance for the respective external sites are displayed. Separate link trees are respectively created in connection with the links that are lower in hierarchy than the URLs 121, 124, and 102, as shown in FIG. 3B.

The link tree (parent tree) of the single site shown in FIG. 3A and the link trees (child trees) of the external sites shown in FIG. 3B are distinguished from each other. Accordingly, the parent tree becomes simplified and easy to see. The external sites are printed on another sheet, thereby preventing a decrease in the volume of information. As a result of the link tree being split into the link trees, correlation between the link trees must be determined. As shown in FIGS. 3A and 3B, no symbols are assigned to actually-printed link trees, and hence correlation is ascertained by reviewing URLs. However, there are various conceivable printing fashions, such as printing of images like icons and thumbnails, for easy identification at a first glance.

The link tree creation program according to the exemplary embodiment of the invention will be specifically described. In FIGS. 3A and 3B, the parent tree and the child tree are separated from each other according to the nature of the sites. However, link trees may also be created in a separated fashion within a single site. Moreover, in the exemplary embodiment, the parent tree is a link tree that takes a Web page designated under predetermined conditions, such as a Web page displayed on the display 25, as a route; and the child tree is a link tree (including a child tree, a grandchild tree, a great-grandchild tree, and others) created separately from a parent tree.

Figure 4:
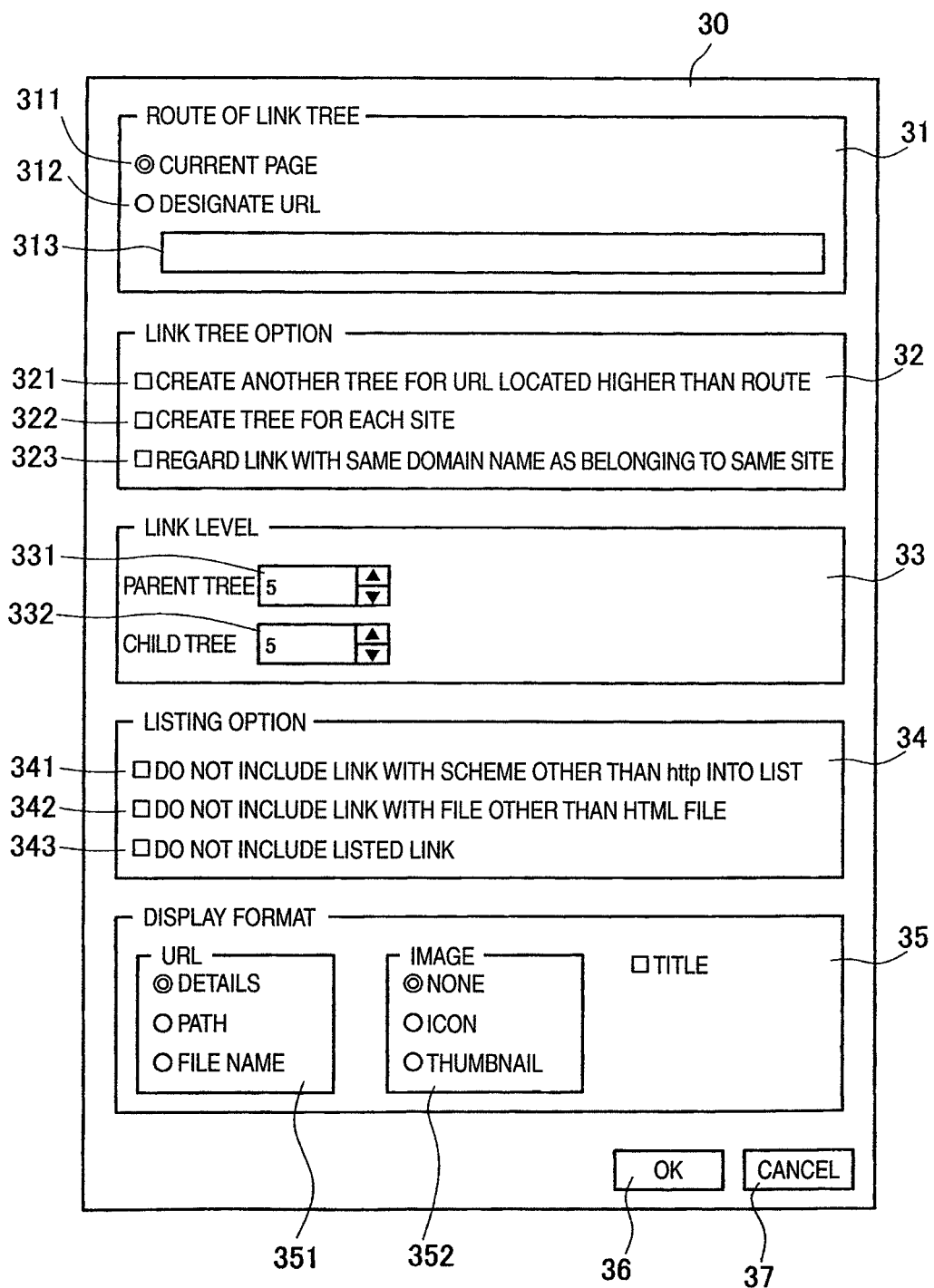
FIG. 4 is a view showing a link tree setting screen.

FIG. 4 is a view showing a link tree setting screen appearing on the display 25 of the client PC2. A tree setting dialog box 30 has a routing field 31 for determining a starting point of a link tree, a link tree option field 32 for selecting a link tree variation, a link level field 33 for determining the number of parent trees and the number of child trees (i.e., the number of hierarchies configuring a link tree), a listing option field 34 for selecting a target to be included in a link tree list, and a display format field 35 for selecting a display format.

The routing field 31 includes a current page designation checkbox 311 for routing a Web page (a "current page") displayed on the display 25 of the client PC2 and an URL designation checkbox 312 for arbitrarily designating a Web page. Settings are usually made such that a link tree is created by designation of the current page designation checkbox 311. In order to designate an arbitrary Web page, an URL input box 313 is prepared. Accordingly, a link tree originating from the Web page is created by inputting an URL of the Web page. In other words, by inputting the URL of the Web page, a link tree rotted from the Web page is created.

The link tree option field 32 has a higher hierarchy option checkbox 321 for creating, in the form of another tree, a link located at a hierarchy, which is higher in structure than the routed Web page, is set in the routing field 31. In addition, the link tree option field 32 has a site-specific option checkbox 322 for creating a link tree for each Web site and an identical site option checkbox 323 for creating a link tree while regarding links with the same domain name as belonging to the same site when a link tree is created for each site. Details of the link tree options will be described in detail by reference to the drawings.

In the exemplary embodiment, a link tree is created while split into a parent tree and child trees as shown in FIGS. 3A and 3B. Hence, the number of hierarchies to which the link tree is to be created must be determined for each of the parent tree and the child trees. Accordingly, the link level field 33 has an input box 331 for designating the number of hierarchies of a parent tree and an input box 332 for designating the number of hierarchies of a child tree. The link tree is created by execution of a program to be described later. However, a value designated here acts as an argument to be passed for executing a subroutine for creating each of the link trees.

Subsequently, the listing option field 34 has an http list checkbox 341 for preventing inclusion of, into a list, a Web page of an URL configured under a scheme name other than http. In general, an URL for linking an HTML file designates a scheme of an "http" like; for example, http://www.a.com/ index, and accesses information by use of a protocol called an HTTP. However, the HTML file also includes an URL having a scheme other than "http," such as an "ftp" (file transfer) and a "mailto" (mail)." The http list checkbox 341 eliminates URLs having schemes, such as an "ftp" and a "mailto," and creates a list of link tree configured by URLs having only an "http" scheme.

The listing option field 34 further has an HTML list checkbox 342 for preventing inclusion of, into a list, a link to a file other than an HTML file. Since the HTML file includes a link to an image, a motion picture, a compressed file, and software of an execute form, the HTML list checkbox is for creating a link tree list by excluding files other than HTML files, such as motion pictures.

Moreover, the listing option field 34 has an overlap elimination list checkbox 343 for preventing inclusion of a listed link into a list. Since the HTML file has a link, such as a "return" and a "top page," the overlap elimination list checkbox is for preventing repeated inclusion of a link to the same Web page into the list in order to prevent an overlap of a link target.

Next, the display format field 35 has an URL selection checkbox 351 for selecting a display level when a link tree to be printed is created by means of an URL display and an icon selection checkbox 352 for simultaneously displaying an image, or the like. The URL selection check box 351 is arranged so as to make it possible to select any of a case where an URL of a Web page is displayed in detail, a case where the URL is displayed by a path name, and a case where the URL is displayed by a file name. Incidentally, the image selection checkbox 352 is arranged so as to make it possible to select any of a case where there is only an URL and where no images are available, a case where an icon is displayed, and a case where a thumbnail is displayed.

The tree setting dialog box 30 includes an OK button 36 and a cancel button 37.

Respective options provided in the link tree option field 32 will be described. FIGS. 5 through 10 are views that conceptually represent the manner of separation of a link tree for indicating optional variations. All of the drawings represent Web sites 41, 42, ..., stored in a WWW server (i.e., a WWW domain) 40 and Web pages (i.e., home pages or the like) 411, 421, and 431 of URLs of interest in the sites.

In the exemplary embodiment, there is provided an explanation for a case where, for example, the Web page 411 in the Web site 41 is displayed on the display 25 (or designated by the URL designation checkbox 312 of the routing field 31) and where a link tree is created so as to be rooted from the Web page 411. The drawings show that, web sites with the same hatching configure a single link tree and that, when Web sites have different hatchings, different link trees are configured.

Figure 5:
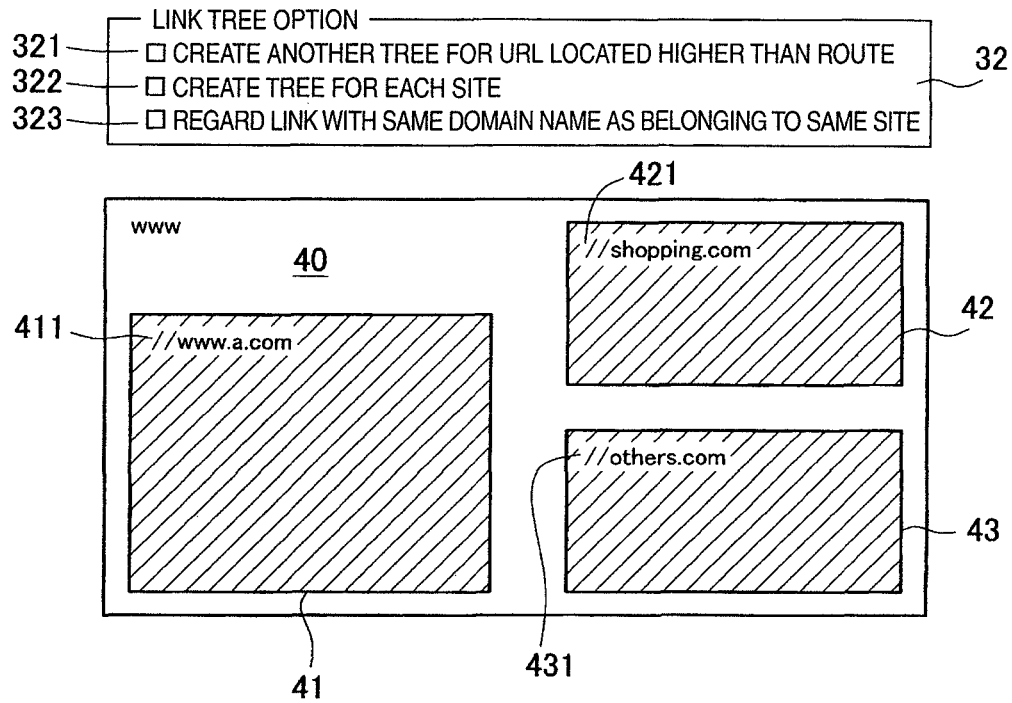
FIG. 5 is a schematic diagram showing the way of splitting a link tree in terms of correlation among Web sites in a case where a link tree is not split.

FIG. 5 shows a case where none of the check boxes in the link tree option field 32 are checked. In this case, all of the linked Web pages 411, 421, 431, ..., are included into a list without making a distinction among the Web sites 41 to 43. Hence, a link tree of a related-art type, such as that shown in FIG. 2, is crated.

Figure 6:
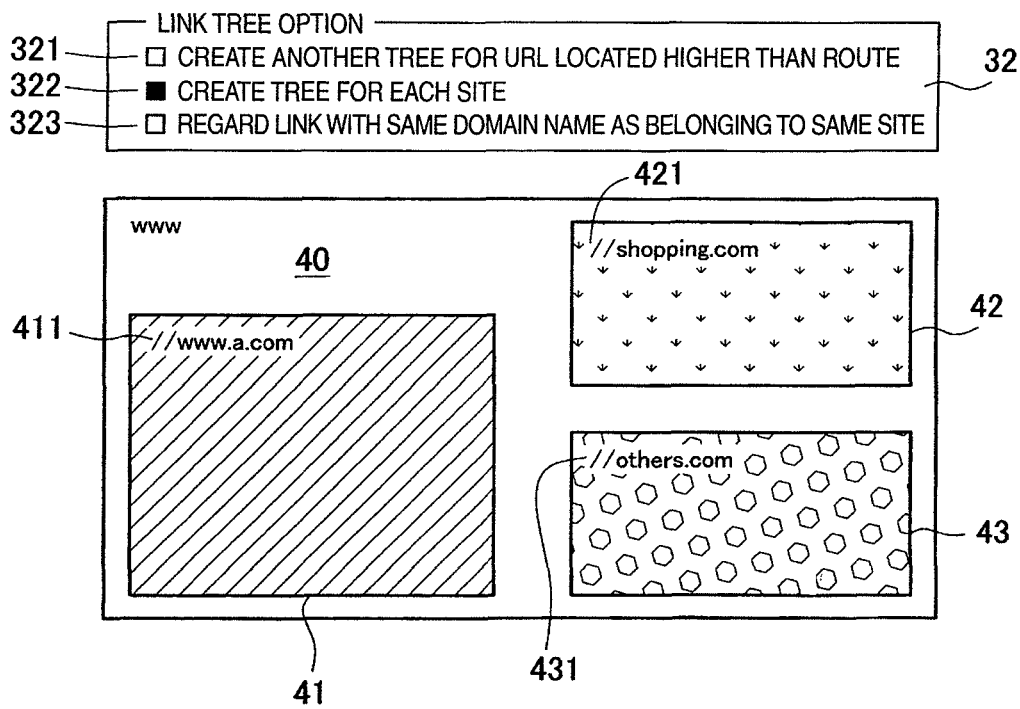
FIG. 6 is a schematic diagram showing the way of splitting a link tree in terms of correlation among Web sites in a case where a link tree is created for each site.

Next, FIG. 6 shows a case where the site-specific option checkbox 322 for creating a link tree for each Web site is checked. Accordingly, a parent tree is created so as to be rooted from the Web page 411 of the designated Web site 41, and child trees are separately created in relation to Web sites 42 and 43 including the linked Web pages 421 and 431; in other words, link trees, such as those shown in FIGS. 3A and 3B, are created.

Figure 7:
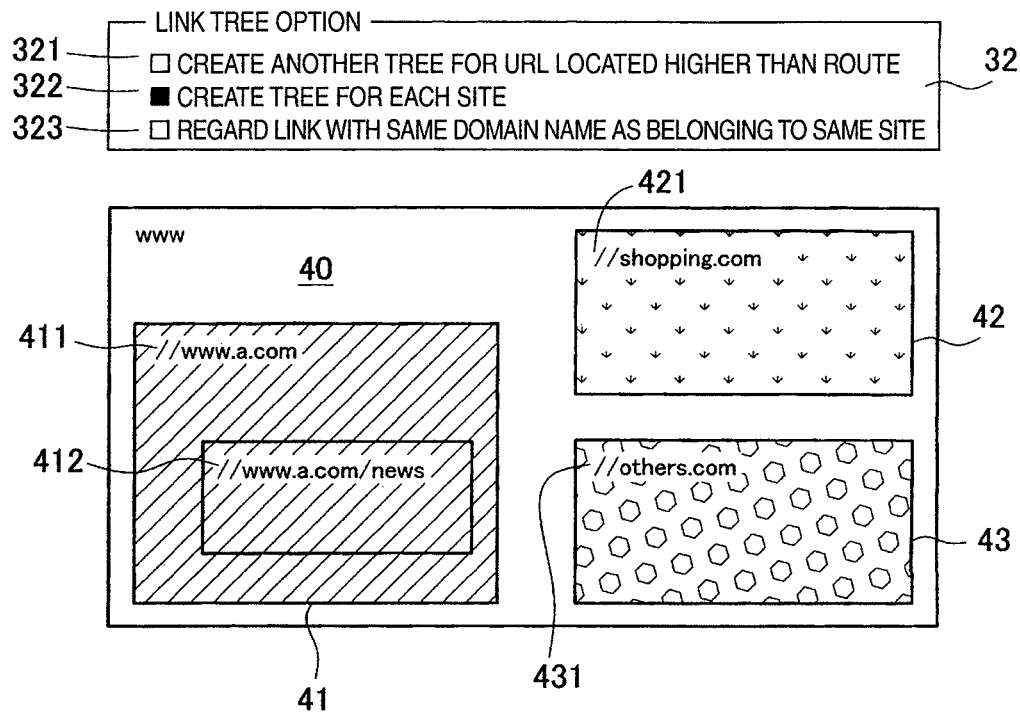
FIG. 7 is a schematic diagram showing the way of splitting a link tree in terms of correlation among Web sites in a case where a link tree having a hierarchy that is higher than that of a route is not created within a single site.

Like FIG. 6, FIG. 7 shows a case where the site-specific option checkbox 322 is checked. Assume that a Web page 412 is displayed on the display 25 of the client PC2, and the Web page 412 is designated by designation of the current page designation checkbox 311. The link indicated by the Web page 412 serving as a starting point of the link tree is located at a hierarchy that is lower in structure than the link indicated by the Web page 411 in the Web site 41. Accordingly, a link tree is created for a hierarchy that is lower in structure than the Web page 412 while the position of the Web page 411 located at a higher hierarchy remains unknown.

Figure 8:
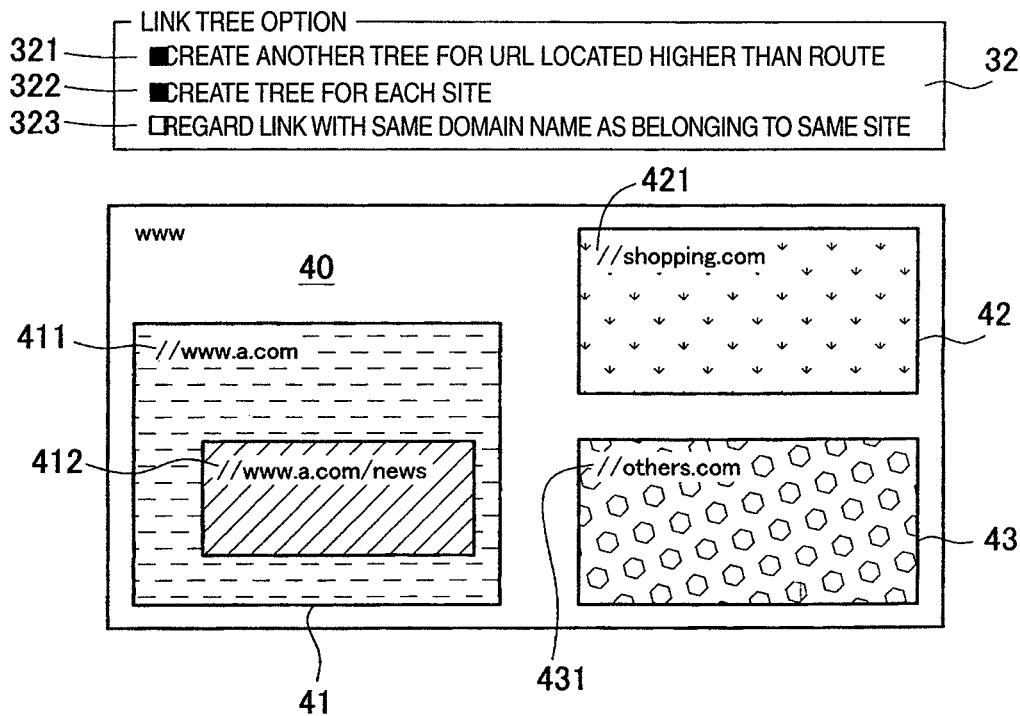
FIG. 8 is a schematic diagram showing the way of splitting a link tree in terms of correlation among Web sites in a case where a link tree having a hierarchy that is higher than that of a route is created within a single site.

In FIG. 8, in addition to the site-specific option checkbox 322, the higher hierarchy option check box 321 for creating a higher-hierarchy link in the form of another tree is also checked. Accordingly, in relation to the Web site 41, a link tree rooted from the Web page 412 is created for a lower-hierarchy link. Further, another link tree having different structure is created for the link indicating the Web page 411 that hierarchy is higher than that of the Web page 412. In this case, the position of the Web page 412 can be ascertained by the higher-hierarchy tree.

Figure 9:
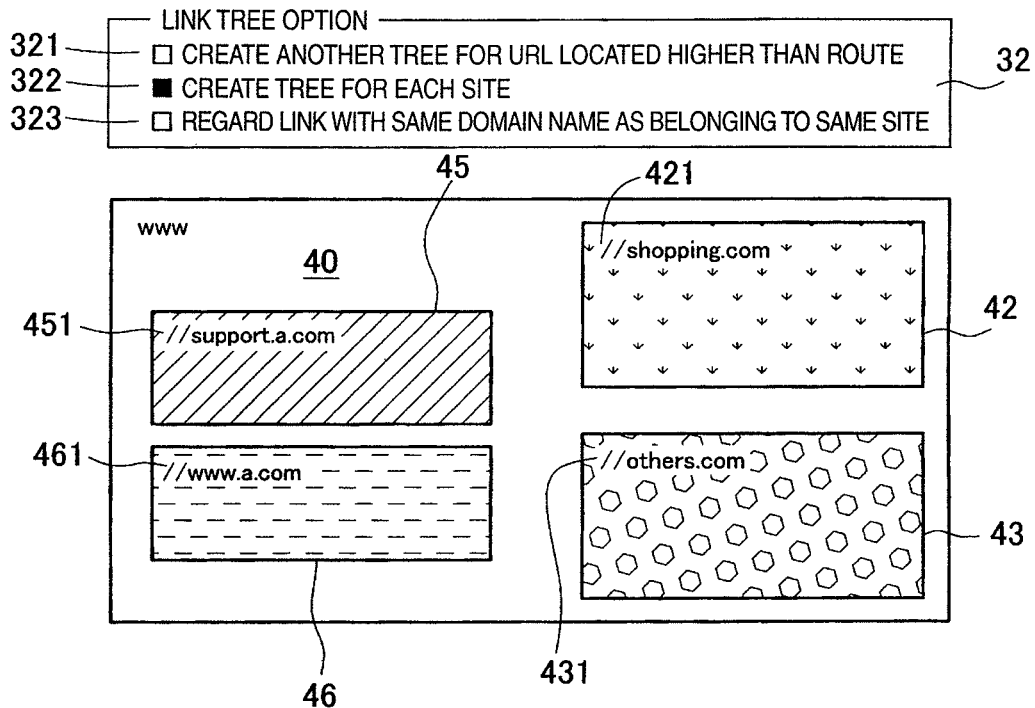
FIG. 9 is a schematic diagram showing the way of splitting a link tree in terms of correlation among Web sites in a case where a link tree is created for each site even within a single domain.
Figure 10:
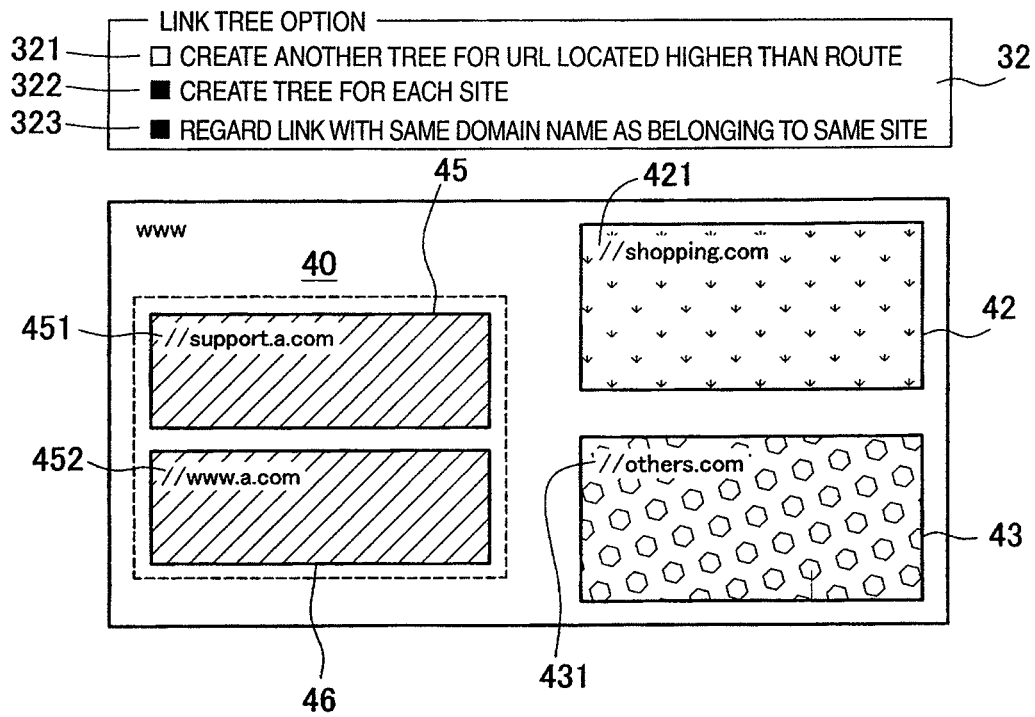
FIG. 10 is a schematic diagram showing the way of splitting a link tree in terms of correlation among Web sites in a case where a single link tree is created even within a single domain.

FIGS. 9 and 10 provide explanations about a case where there are Web sites 45 and 46 which have the same domain name "a.com" and which are configured as different sites. Like FIG. 6, FIG. 9 shows that the site-specific option checkbox 322 of the link tree option field 32 is checked. Accordingly, link trees separated for the different Web sites 45 and 46 and the Web sites 43 and 43 are created.

In FIG. 10, in addition the site-specific option checkbox 322, the identical site option checkbox 323 is also checked. Accordingly, a single link tree is created, for the Web sites 45 and 46 having the URLs whose domain names are the same, so as to be rooted from the routed Web page 451. Different link trees are respectively created for the other Web sites 42 and 43 not having the common domain name.

Figure 11:
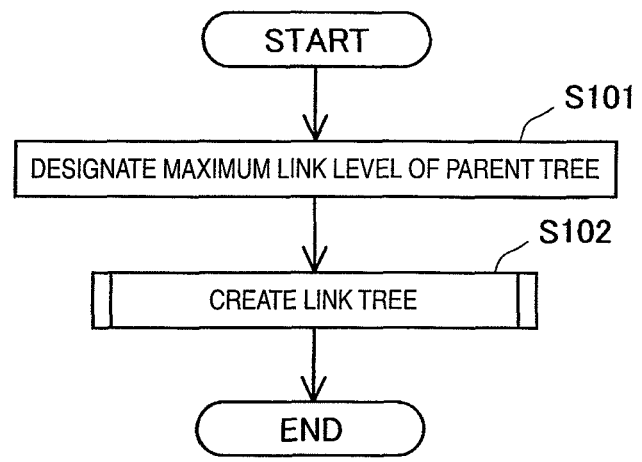
FIG. 11 is a view showing a flowchart of processing of a link tree creation program.
Figure 12:
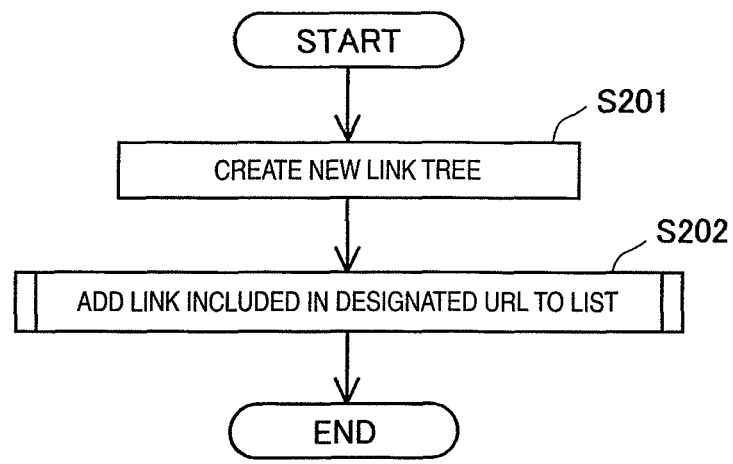
FIG. 12 is a view showing a flowchart of link tree creation processing.

Subsequently, the link tree creation program executed by the printer 1 will be specifically described. FIG. 11 is a view showing a main flow of processing of the link tree creation program, and FIGS. 12 through 15 are views showing subflows of the main flow.

In the client PC2, an icon button denoting a link tree is clicked while; for example, the Web page is displayed on the display 25. The setting screen shown in FIG. 2 is thereby displayed on the display 25, and items, such as the routing field 31 and the link tree option field 32, are checked. Creation of a link tree is commenced as a result of the OK button 36 being clicked.

In the client PC2, upon receipt of a link tree creation start signal, the CPU 21 starts execution of the link tree creation program. First, the maximum link level of the parent tree is designated on the basis of numerical data set and input by the link level field 33 in accordance with the flowchart shown in FIG. 11 (S101), and processing proceeds to specific creation of the link tree (S102). Processing then proceeds to a flowchart shown in FIG. 12, and a new link tree list is made up (S201). URLs of linked Web pages rooted from the Web page of the URL designated in the routing field 31 are read into the prepared vacant link tree list, and the read URLs are additionally written into to the list (S202).

Figure 13:
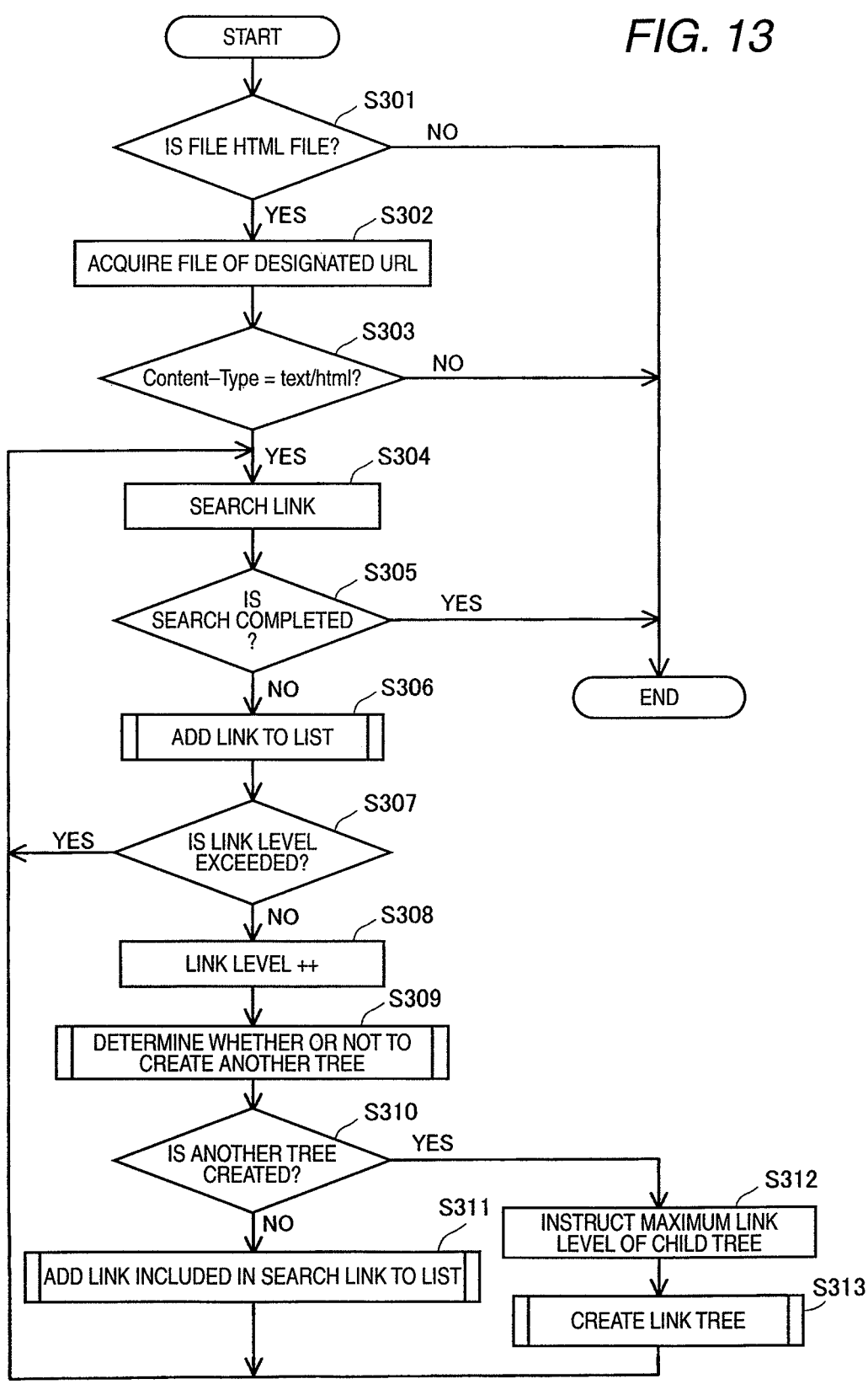
FIG. 13 is a view showing a flowchart of processing for adding a link to a list.
Figure 14:
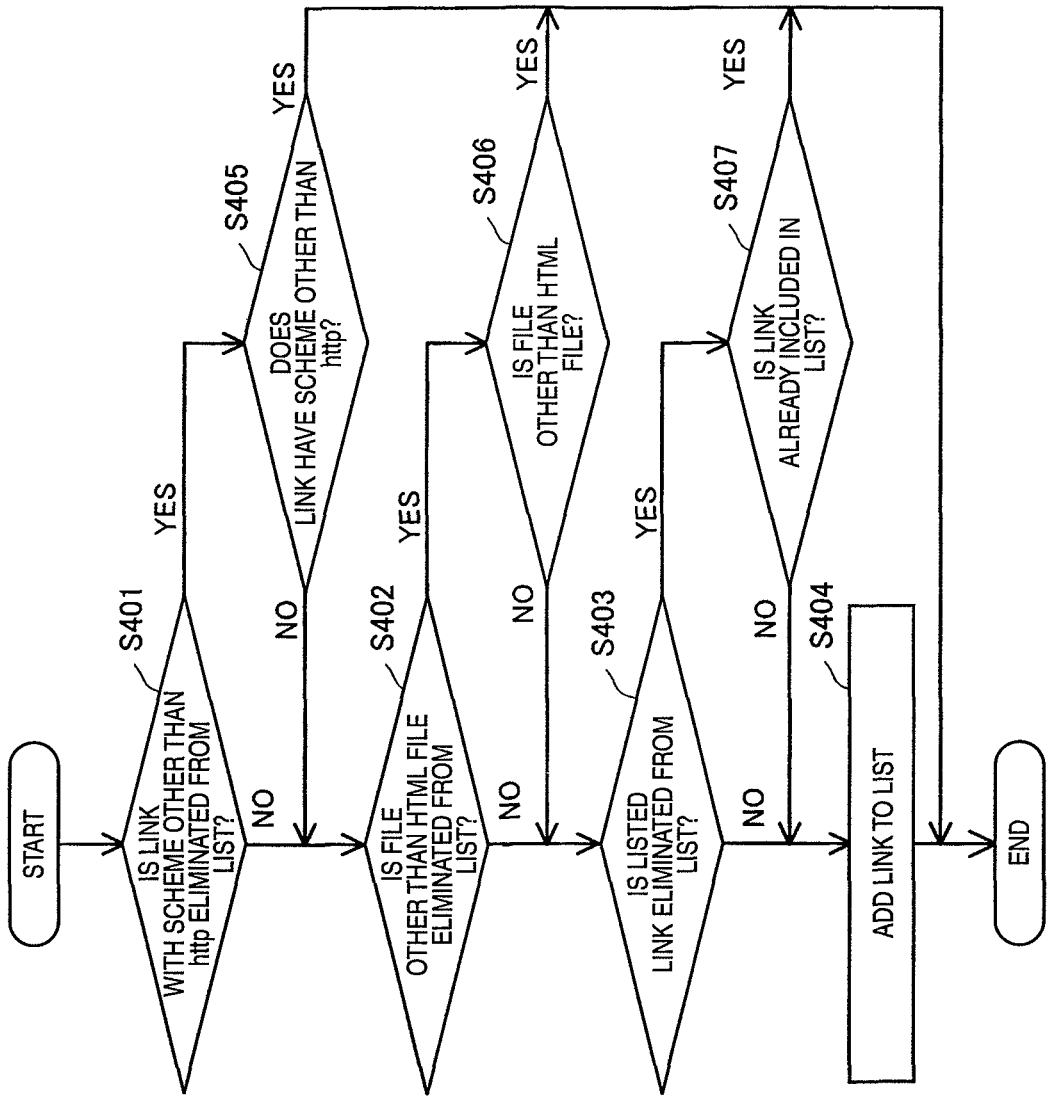
FIG. 14 is a view showing a flowchart of processing for determining whether or not a link is added to a list.
Figure 15:
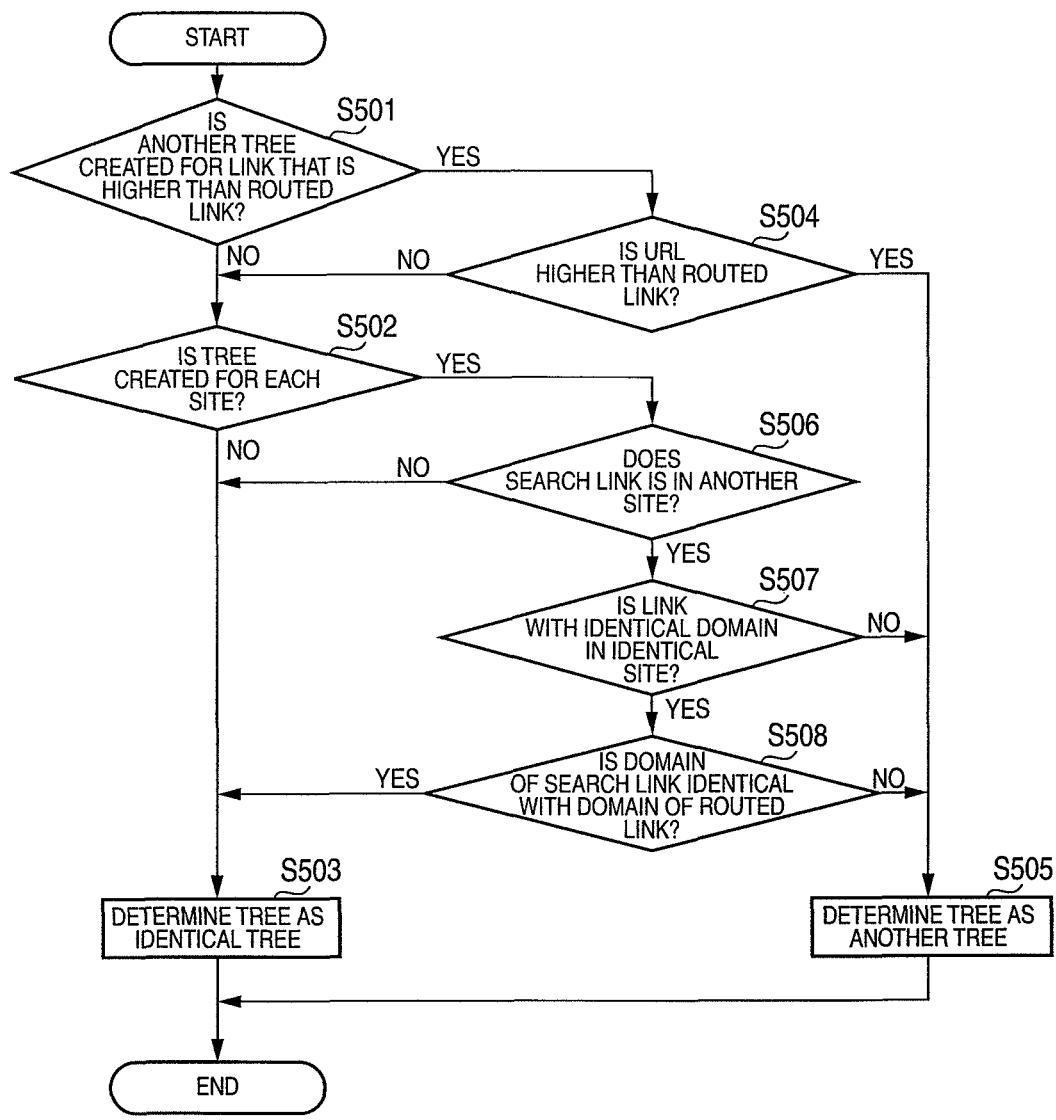
FIG. 15 is a view showing a flowchart of processing for determining whether or not another tree is created.

Next, writing of a Web page into the list pertaining to S202 will be described by reference to a flowchart shown in FIG. 13. First, on the basis of an URL of a Web page that is a target of link check, it is checked whether or not the file is an HTML file (S301). A file with a specific file extension, such as an image and a motion picture, is determined not to be an HTML file (NO in S301), and creation of a link tree is completed. In contrast, when a file is determined to be possibly an HTML file for reasons of presence of an extension other than the specific file extension (YES in S301), the file of the Web page is acquired from the WWW server (S302).

A determination is made as to whether or not the file of the Web page sent from the WWW server is actually an HTML file (S303). In other words, at S303, determination is made as to whether or not a header of the file (i.e., "Content-Type:") of the Web page indicates that message content is html (i.e., "Content-Type: text/html"). As a consequence, when the file is not an HTML file (NO in S303), creation of a link tree is completed. In contrast, when the file is an HTML file (YES in S303), the HTML file is then analyzed, and a link placed on that Web page (i.e., specified Web page) is searched (S304) (one example of a link search unit). In relation to a search for a link, a check is first made as to whether or not there is a link. When there are a plurality of links, a check is made as to whether or not a search for all of the links has been carried out (S305). When no links are found or when the search for all of the links is completed (YES in S305), creation of the link tree is completed.

In contrast, when links are found (NO in S305), URLs with the links are written and sequentially added to the list made up in S201 (S306) (one example of a link list preparation unit). Addition of the links to the list is performed in accordance with a flowchart shown in FIG. 14. In the flowchart, a determination is made as to whether or the link is added to the list by ascertaining an URL of the link. The determination complies with check items in the listing option field 34 shown in FIG. 4.

Accordingly, a check as to whether the http list checkbox 341 for eliminating a link of an URL configured under a scheme name other than http is set in ON or OFF (S401); a check as to whether the HTML list checkbox 342 for eliminating a link of a file other than an HTML file is set in ON or OFF (S402); and a check as to whether or not the overlap elimination list checkbox 343 for eliminating a listed link is set in ON or OFF (S403) are sequentially made.

When all of the items are set in OFF (NO in S401 to S403), an URL of a link that is an object of search (hereinafter called a "search link") is added to the list (S404). In contrast, when the http list checkbox 341 is set to ON (YES in S401), a scheme of the URL of the search link is ascertained (S405). If the scheme is other than http, processing is terminated without addition of the URL to the list (YES in S405). When the scheme is http, processing proceeds to S402 (NO in S405). Accordingly, when the HTML list checkbox 342 is set to ON (YES in S402), a file of the search link is ascertained (S406). When the file is other than an HTML file, processing is terminated without addition of the URL to the list (YES in S406). When the file is an HTML file, processing proceeds to S403 (NO in S406).

Accordingly, when the overlap elimination list checkbox 343 is set to ON (YES in S403), the list is ascertained (S407). When the URL identical with the URL of the search link is already written in the list, processing is terminated without addition of the URL to the list (YES in S407). When the identical URL is not ascertained (NO in S407), the URL of the search link is added to the list (S404). Thus, addition of the link to the list pertaining to S306 shown in FIG. 13 is carried out.

Turning back to FIG. 13, the maximum link level designated in S101 is ascertained (S307). The search for a link (S304) proceeds from a higher hierarchy to a lower hierarchy, and hence a determination is made as to whether or not the hierarchy of the search link exceeds the maximum link level received by means of the argument. When the hierarchy of the search link exceeds the link level (YES in S307), processing returns to S304, and a search for a higher hierarchy is continually performed. In contrast, when the hierarchy does not exceeds the link level (NO in S307), a count of the link level is incremented (S308).

Next, a determination is made as to whether or not another tree is made up (S309). The determination is made in accordance with a flowchart shown in FIG. 15. A determination is made by checking an URL of the search link, and the check complies with check items in the link tree optional field 32 shown in FIG. 4. Specifically, a check as to whether or not the higher hierarchy option checkbox 321 for creating, in the form of another tree, a link that is higher than the routed link is set in ON or OFF (S501) and a check as to whether or not the site-specific option checkbox 322 for creating a link tree for each Web site is set in ON or OFF (S502) are sequentially made.

When all of the items are set in OFF (NO in S501 and S502), the tree is determined to be identical (S503). In contrast, when the higher hierarchy option checkbox 321 is ascertained to be set in ON (YES in S501), it is checked whether or not a link that is higher than the routed link is present in the same site (S504). When a higher-hierarchy URL is present in the same site (YES in S504), the tree is determined to be another tree (S505). When a higher-hierarchy link is not present in the same site (NO in S504), processing proceeds to S502. When the site-specific option check box 322 is ascertained to be set in ON (YES in S502), a check is made as to whether or not the search link is located in another site. When the search link is in the same site (NO in S506), the tree is determined to be an identical tree (S503).

In contrast, when the site is another site (YES in S506), a determination is made as to whether or not the item of the identical site option checkbox 323 in the link tree option field 32 shown in FIG. 4 is checked (S507). When the identical site option checkbox 323 is set in OFF, (NO in S507), the tree is determined to be another tree (S505). Even when the identical site option checkbox is set in ON (YES in S507), if a domain of the URL of the search link is determined to be different by a comparison of the URL with an URL of the routed link (NO in S508), the tree is determined to be another tree (S505). On the other hand, when the identical site option checkbox 323 is set in ON (YES in S507) and when the domain of the URL is identical with that of the URL of the routed link (YES in S508), the tree is determined to be identical (S503).

Subsequently, processing returns to the flowchart shown in FIG. 13, and a check is made as to whether or not another tree is created on the basis of a result of the determination made in S309 (S310) (one example of a tree addition determination unit). When the determination result shows that a link tree is not separately created (NO in S310), a link included in the URL of the search link; namely, a link that is much lower than the link placed on the Web page of the URL, is added to the same link tree list made up in S201 (S311). In relation to creation of a list at a lower hierarchy, addition of a list complying with the flowchart shown in FIG. 13 is performed. Accordingly, a search for a link at a lower hierarchy is performed until a link level over is attained (YES in S307).

Subsequently, a search for a link at a higher hierarchy and addition of a link to a list are iteratively performed.

When a link tree is separately prepared on the basis of the result of the determination rendered in S309 (YES in S310), the maximum link level of the child tree is designated in accordance with numerical data set and input by way of the link level field 33 shown in FIG. 4 (S312). Aside from the parent tree shown in FIG. 3A, a child tree shown in FIG. 3B is made up (S313) (one example of a tree creation unit). For example, when the search link is in a site differing from the site where the routed link is situated, a child tree rooted from the URL of the search link is additionally created. Creation of a child tree is performed in the same manner as is the parent tree, and a new link tree list is first made up in accordance with the flowchart shown in FIG. 12 (S201). Links included in the URLs of the external sites are additionally written into a vacant link tree list (S202).

When creation of a child tree is terminated by a link level over (YES in S307), processing returns to search for a link to the parent tree (S304), and processing is continually performed. Addition and writing of links to the list are repeated likewise, and the search for all routed links is terminated (YES in S305). Thus, a list for creating a link tree is made up (S202). Accordingly, the link trees shown in FIGS. 2, 3A, and 3B are created on the basis of the link list (S102). The created link trees are printed by the printer 1.

In the exemplary embodiment, link trees can be separated according to; for example, a site. As shown in FIGS. 3A and 3B, a plurality of link trees are created, and they can be printed. Therefore, Web pages belonging to the same site can be ascertained by means of a parent tree, and links to external sites can be additionally ascertained by means of child trees. As a result, complicate links are simplified and become easy to see, and usefulness of the link tree that is effective information can be further enhanced.

Moreover, by checking the identical site option checkbox 323 of the link tree option field 32, even a link of another site is arranged in the same link tree, the link has the same domain name. Thus, excessive break-down of the link tree can be prevented, and the link tree can be easily viewable.

Further, by checking the higher hierarchy option checkbox 321 of the link tree option field 32, a link that is higher than the link serving as a starting point is created in the form of another link tree. Therefore, the positional relationship of the link serving as the starting point becomes easy to see.

Since the number of hierarchies of a link tree is designated by entry of a numerical input by way of the link level field 33, a link tree of an appropriate size can be created even when a link is endlessly continuous.

By checking the http list check box 341 of the listing option field 34, it is possible to create a link tree from which a link that is not necessary as information or has a low degree of necessity is eliminated.

Moreover, the display level of the URL is displayed in the form of a path name or a file name by means of the URL selection checkbox 351 of the display format field 35, thereby simplifying the entire link tree, making the tree easy to see, and make contents of a Web page corresponding to the link easy to understand. Further, so long as an icon or a thumbnail is added to an URL by the image selection checkbox 352, correlation between links of child trees bifurcated from a parent tree becomes easy to check.

Although the link tree creation program and device of the invention have been described, the invention is not limited to the program and the device and is susceptible to various alterations within the scope of the gist of the invention.

What is claimed is:

1. A non-transitory computer-readable medium having a link tree creation program stored thereon and readable by a computer, the link tree creation program, when executed by the computer, causing the computer to create a link tree in relation to links associated with Web pages that are receivable via a network, and the link tree creation program causing the computer to function as:
   a link search unit configured to search a plurality of links from a file of a specified Web page;
   a link list preparation unit configured to add the plurality of searched links to a list of the link tree, a root of the link tree indicating a link to the specified Web page;
   a tree addition determination unit configured to compare each of the plurality of searched links with the root of the link tree, and to determine whether each Web page of Web pages indicated by the plurality of searched links from the file of the specified Web page is located in a second site, which is an external site to a first site in which the specified Web page is located; and
   a tree creation unit configured to create the link tree,
   wherein the tree creation unit is further configured to create an additional link tree when the tree addition determination unit determines that the Web page indicated by one searched link among the plurality of searched links from the file of the specified Web page is located in the second site,
   wherein the additional link tree comprises a root identical to the one searched link that indicates the Web page is located in the second site,
   wherein the additional link tree further comprises links associated with the Web page located in the second site at a hierarchy lower than a hierarchy of the root of the additional link tree,
   wherein the link tree comprises the one searched link identical to the root of the additional link tree at a hierarchy lower than a hierarchy of the link to the specified Web page indicating the root of the link tree when the tree addition determination unit determines that the Web page indicated by one searched link among the plurality of searched links from the file of the specified Web page is located in the second site, and
   wherein the link tree comprises one searched link indicating the Web page located in the first site at a hierarchy lower than the hierarchy of the link to the specified Web page indicating the root of the link tree when the tree addition determination unit determines that the Web page indicated by the one searched link among the plurality of searched links from the file of the specified Web page is located in the first site.

2. The non-transitory computer-readable medium according to claim 1,
   wherein, when the tree addition determination unit determines that the second site is different from the first site and that a uniform resource locator ("URL") indicated by the searched link and a URL indicated by the root of the link tree have an identical domain name, the tree creation unit does not create the additional link tree.

3. A non-transitory computer-readable medium having a link tree creation program stored thereon and readable by a computer, the link tree creation program, when executed by the computer, causing the computer to create a link tree in relation to links associated with Web pages that are receivable via a network, and the link tree creation program causing a computer to function as:
   a link search unit configured to search a plurality of links from a file of a specified Web page;

a link list preparation unit configured to add the plurality of searched links to a list of the link tree, a root of the link tree indicating a link to the specified Web page;

a tree addition determination unit configured to compare each of the plurality of searched links with the root of the link tree, and to determine whether each searched link of the plurality of searched links indicating a Web page comprises a higher-hierarchy link, the higher-hierarchy link having a hierarchy higher than a hierarchy of the link of the root of the link tree; and a tree creation unit configured to create the link tree, wherein the tree creation unit is further configured to create an additional link tree when the tree addition determination unit determines that one searched link among the plurality of searched links indicating the Web page comprises the higher-hierarchy link, the additional link tree comprising:

a root identical to the one searched link comprising the higher-hierarchy link;

the link to the specified Web page indicating the root of the link tree at a hierarchy lower than a hierarchy of the root of the additional link tree; and links associated with the Web page indicated by the one searched link at a hierarchy lower than the hierarchy of the root of the additional link tree, and wherein the link tree comprises one searched link that does not comprise the higher-hierarchy link at a hierarchy lower than the hierarchy of the link to the specified Web page indicating the root of the link tree when the tree addition determination unit determines that the one searched link among the plurality of searched links indicating the Web page does not comprise the higher-hierarchy link.

4. The non-transitory computer-readable medium according to claim 1, wherein the non-transitory computer-readable medium further comprises instructions that, when executed by the computer, cause the computer to function as a hierarchy determination unit that, upon receipt of a signal designating a number of hierarchies of respective link trees, searches links to the hierarchies.

5. The non-transitory computer-readable medium according to claim 1, wherein the link list preparation unit comprises a listing unit that does not add the searched link to the list of the link tree when the listing unit confirms that the searched link corresponds to at least one of a link to a uniform resource locator configured under a scheme name other than http, a link to a file other than a hypertext markup language file, and a link that has been listed on the list of the link tree.

6. The non-transitory computer-readable medium according to claim 1, wherein the computer comprises a display unit, and wherein the computer-readable medium further comprises instructions that, when executed by the computer, cause the computer to function as a routing unit that creates a link tree routed from a link to a Web page displayed on a display unit or from a link to a designated uniform resource locator.

7. The non-transitory computer-readable medium according to claim 1, wherein the link tree is configured such that each link of the link tree displays a uniform resource locator ("URL").

8. The non-transitory computer-readable medium according to claim 7, wherein the link-tree creation program further causes the computer to function as a display level selection unit that selects a display level of the URL.

9. The non-transitory computer-readable medium according to claim 7, wherein the link-tree creation program further causes the computer to function as an image display selection unit that selects a display of an image comprising an icon or a thumbnail in addition to the URL.

10. A link tree creation device configured to create a link tree in relation to links associated with Web pages that are receivable via a network, the link tree creation device comprising:

a link search unit configured to search a plurality of links from a file of a specified Web page;

a link list preparation unit configured to add the plurality of searched links to a list of the link tree, a root of the link tree indicating a link to the specified Web page;

a tree addition determination unit configured to compare each of the plurality of searched links with the root of the link tree, and to determine whether each Web page of Web pages indicated by the plurality of searched links from the file of the specified Web page is located in a second site, which is an external site to a first site in which the specified Web page is located; and a tree creation unit configured to create the link tree, wherein the tree creation unit is further configured to create an additional link tree when the tree addition determination unit determines that the Web page indicated by one searched link among the plurality of searched links from the file of the specified Web page is located in the second site, wherein the additional link tree comprises a root identical to the one searched link that indicates the Web page is located in the second site, wherein the additional link tree further comprises links associated with the Web page located in the second site at a hierarchy lower than a hierarchy of the root of the additional link tree, wherein the link tree comprises the one searched link identical to the root of the additional link tree at a hierarchy lower than a hierarchy of the link to the specified Web page indicating the root of the link tree when the tree addition determination unit determines that the Web page indicated by one searched link among the plurality of searched links from the file of the specified Web page is located in the second site, and wherein the link tree comprises one searched link indicating the Web page located in the first site at a hierarchy lower than the hierarchy of the link to the specified Web page indicating the root of the link tree when the tree addition determination unit determines that the Web page indicated by the one searched link among the plurality of searched links from the file of the specified Web page is located in the first site.

11. A method for creating a link tree in relation to links associated with Web pages that are receivable via a network, the method comprising:

searching a plurality of links from a file of a specified Web page;

adding the plurality of searched links to a list of the link tree, a root of the link tree indicating a link to the specified Web page;

comparing each of the plurality of searched links with the root of the link tree, and determining whether each Web page of Web pages indicated by the plurality of searched links from the file of the specified Web page is located in a second site, which is an external site to a first site in which the specified Web page is located;

creating an additional link tree when determining that the Web page indicated by one searched link among the plurality of searched links from the file of the specified Web page is located in the second site, wherein the additional link tree comprises a root identical to the one searched link that indicates the Web page is located in the second site, and wherein the additional link tree further comprises links associated with the Web page located in the second site at a hierarchy lower than a hierarchy of the root of the additional link tree;

creating the link tree to comprise the one searched link identical to the root of the additional link tree at a hierarchy lower than a hierarchy of the link to the specified Web page indicating the root of the link tree when determining that the Web page indicated by one searched link among the plurality of searched links from the file of the specified Web page is located in the second site; and creating the link tree to comprise one searched link indicating the Web page located in the first site at a hierarchy lower than the hierarchy of the link to the specified Web page indicating the root of the link tree when determining that the Web page indicated by the one searched link among the plurality of searched links from the file of the specified Web page is located in the first site.

12. A link tree creation device configured to create a link tree in relation to links associated with Web pages that are receivable via a network, the link tree creation device comprising:

a link search unit configured to search a plurality of links from a file of a specified Web page;

a link list preparation unit configured to add the plurality of searched links to a list of the link tree, a root of the link tree indicating a link to the specified Web page;

a tree addition determination unit configured to compare each of the plurality of searched links with the root of the link tree, and to determine whether each searched link of the plurality of searched links indicating a Web page comprises a higher-hierarchy link, the higher-hierarchy link having a hierarchy higher than a hierarchy of the link of the root of the link tree; and a tree creation unit configured to create the link tree, wherein the tree creation unit is further configured to create an additional link tree when the tree addition determination unit determines that one searched link among the plurality of searched links indicating the Web page comprises the higher-hierarchy link, the additional link tree comprising:

a root identical to the one searched link comprising the higher-hierarchy link;

the link to the specified Web page indicating the root of the link tree at a hierarchy lower than a hierarchy of the root of the additional link tree; and links associated with the Web page indicated by the one searched link at a hierarchy lower than the hierarchy of the root of the additional link tree, and wherein the link tree comprises one searched link that does not comprise the higher-hierarchy link at a hierarchy lower than the hierarchy of the link to the specified Web page indicating the root of the link tree when the tree addition determination unit determines that the one searched link among the plurality of searched links indicating the Web page does not comprise the higher-hierarchy link.

13. A method for creating a link tree in relation to links associated with Web pages that are receivable via a network, the method comprising:

searching a plurality of links from a file of a specified Web page;

adding the plurality of searched links to a list of the link tree, a root of the link tree indicating a link to the specified Web page;

comparing each of the plurality of searched links with the root of the link tree, and determining whether each searched link of the plurality of searched links indicating a Web page comprises a higher-hierarchy link, the higher-hierarchy link having a hierarchy higher than a hierarchy of the link of the root of the link tree;

creating an additional link tree when determining that one searched link among the plurality of searched links indicating the Web page comprises the higher-hierarchy link, the additional link tree comprising:

a root identical to the one searched link comprising the higher-hierarchy link;

the link to the specified Web page indicating the root of the link tree at a hierarchy lower than a hierarchy of the root of the additional link tree; and links associated with the Web page indicated by the one searched link at a hierarchy lower than the hierarchy of the root of the additional link tree; and creating the link tree to comprise one searched link that does not comprise the higher-hierarchy link at a hierarchy lower than the hierarchy of the link to the specified Web page indicating the root of the link tree when determining that the one searched link among the plurality of searched links indicating the Web page does not comprise the higher-hierarchy link.

14. The non-transitory computer-readable medium according to claim 1, wherein the non-transitory computer-readable medium further comprises instructions that, when executed by the computer, cause the computer to perform function as:

a setting unit configured to set: (a) a first number of hierarchies indicating a number of hierarchies configuring the link tree, and (b) a second number of hierarchies indicating a number of hierarchies configuring the additional link tree, the first number of hierarchies and the second number of hierarchies being set independently of each other, wherein the tree creation unit is configured to:

create the link tree by searching the links for the first number of hierarchies from the root of the specified Web page and by adding the plurality of searched links to the list of the link tree; and create the additional link tree by searching the links for the second number of hierarchies from the root of the Web page located in the second site and by adding the plurality of searched links to the list of the additional link tree.

15. The non-transitory computer-readable medium according to claim 3, wherein the non-transitory computer-readable medium further comprises instructions that, when executed by the computer, cause the computer to perform function as:

a setting unit configured to set: (a) a first number of hierarchies indicating a number of hierarchies configuring the link tree, and (b) a second number of hierarchies indicating a number of hierarchies configuring the additional link tree, the first number of hierarchies and the second number of hierarchies being set independently of each other, wherein the tree creation unit is configured to:
create the link tree by searching the links for the first number of hierarchies from the root of the specified Web page and by adding the plurality of searched links to the list of the link tree; and
create the additional link tree by searching the links for the second number of hierarchies from the root of the Web page comprising the higher-hierarchy link and by adding the plurality of searched links to the list of the additional link tree.

\* \* \* \* \*